3,167,386
COMPLEX PERCHLORATE COMPOUND AND ITS PRODUCTION
Albert D. McElroy, Mars, Joseph S. Hashman, Evans City, and Jack C. Renforth, Valencia, Pa., assignors to Callery Chemical Company, Pittsburgh, Pa., a corporation of Pennsylvania
No Drawing. Filed Feb. 10, 1961, Ser. No. 88,577
13 Claims. (Cl. 23—14)

This invention relates to tris(nitronium)aluminum hexaperchlorate, $(NO_2)_3Al(ClO_4)_6$, and its production.

Solid compounds having high proportions of oxygen, and therefore of high oxidizing power, are of considerable interest for use in new applications in which such properties are desirable. Among the oxidizers having such high oxidizing power are those containing the perchlorate anion and therefore new perchlorates are constantly being sought.

It is an object of this invention to provide a new compound containing an extremely high proportion of combined oxygen and having high oxidizing properties.

Another objection is to produce a new compound in which the perchlorate anion predominates.

Other objects will become apparent from time to time hereinafter.

This invention is based upon our discovery of a new complex perchlorate compound of the formula $$(NO_2)_3Al(ClO_4)_6$$

This compound, tris(nitronium)aluminum hexaperchlorate, is produced by the reaction of complex aluminum nitrate and nitrosyl perchlorate, $NOClO_4$, or nitronium perchlorate, $NO_2ClO_4$, at 100° C. or higher.

The complex aluminum nitrate as referred to in this specification is produced by the reaction of an aluminum halide with nitrogen dioxide, preferably using at least 7 mols of nitrogen dioxide per mol of aluminum halide and generally carried out at about 0° C. While its exact formula is not known with certainty, analysis shows that it has four nitrogens per aluminum; the amount of oxygen present is somewhat uncertain but it is believed to be eleven or nearly eleven atoms per atom of aluminum. Therefore, the formula $AlN_4O_{11}$ is used to refer to this material in this specification.

Nitrosyl perchlorate has the formula $NOClO_4$ and may be produced by bubbling nitrogen dioxide through 72% perchloric acid, while nitronium perchlorate has the formula $NO_2ClO_4$ and is made by reacting nitrogen dioxide, chlorine dioxide and ozone and providing for intimate mixing of these gases.

Using the above formula for the complex aluminum nitrate, the reactions described appear to follow those shown in Equations 1 and 2.

(1) $AlN_4O_{11} + 6NO_2ClO_4 \rightarrow$
$(NO_2)_3Al(ClO_4)_6 + 3N_2O_5 + NO_2$ (2) $AlN_4O_{11} + 6NOClO_4 \rightarrow$
$(NO_2)_3Al(ClO_4)_6 + 3NO + 4NO_2$ Other than elevated temperatures, which should be at least about 100° C. and which can be as high as desired up to the decomposition temperature of the reactants and product, the conditions for carrying out the reaction of the complex aluminum nitrate and the perchlorate are not critical. Thus, the ratio of the reactants does not affect operability of the method, but in order to obtain a pure product it is desirable to consume all the complex aluminum nitrate present. When this is done, the only solid in the product mixture is the desired tris(nitronium)aluminum hexaperchlorate, and therefore problems of recovery and purification are avoided. As shown by Equations 1 and 2, in order to utilize all the complex aluminum nitrate at least 6 mols of the perchlorate compound should be used. When nitronium perchlorate is the reacting perchlorate, satisfactory results are achieved by using a 6 to 1 molar ratio. However, when nitrosyl perchlorate is used we have found that somewhat higher molar ratios are necessary in order to achieve complete reaction. Thus, about 10 mols of nitrosyl perchlorate per mol of complex aluminum nitrate or more are used.

Similarly no solvent or reaction medium is necessary but since the reaction takes place between two solids, it is desirable to obtain intimate mixing of the reactants. One way in which we have found this to be easily achieved is by dispersing the reactants in a low boiling inert liquid and then evaporating off the liquid prior to heating the mixture.

Illustrating the foregoing is the following example.

*Example 1.*—9.83 millimols of complex aluminum nitrate were mixed with 59.1 millimols of nitronium perchlorate, $NO_2ClO_4$, in Freon-12 at 178° C. The Freon was then evaporated off and the intimate mixture thereby obtained was heated to 125° C. for twenty-four hours. 4.94 grams of tris(nitronium)aluminum hexaperchlorate of the formula $(NO_2)_3Al(ClO_4)_6$ were obtained.

In a similar manner, nitrosyl perchlorate, $NOClO_4$, is used to produce tris(nitronium)aluminum hexaperchlorate by reaction with complex aluminum nitrate; however, about 10 mols of nitrosyl perchlorate per mol of aluminum nitrate are generally used in this instance.

The overall process using nitronium perchlorate is carried out by reacting an aluminum halide with nitrogen dioxide to produce the complex aluminum nitrate and then reacting this product with ntironium perchlorate in the manner described above. The following example illustrates this overall process.

*Example 2.*—12.6 millimols of aluminum chloride were reacted with excess nitrogen dioxide (over 85 millimols) at 0° C. for three hours to produce 12.6 millimols of complex aluminum nitrate. This product was then mixed with 169.6 millimols of nitronium perchlorate, $NO_2ClO_4$, in Freon-12 and after the Freon was evaporated from the mixture it was heated at 116° C. for twenty-four hours. The solid product obtained was analyzed and shown to be tris(nitronium)aluminum hexaperchlorate, $$(NO_2)_3Al(ClO_4)_6$$

When nitrosyl perchlorate is the reacting species, the preferred embodiment of our process comprises producing a mixture of the complex aluminum nitrate and nitrosyl perchlorate by first reacting an aluminum halide, nitronium perchlorate and nitrogen dioxide. In this system, the following reactions appear to take place (X=halogen):

(3)   $NO_2ClO_4 + 2NO_2 \rightarrow NOClO_4 + N_2O_5$ (4)   $AlX_3 + 7NO_2 \rightarrow AlN_4O_{11} + 3NOX$ (5)   $N_2O_5 \rightarrow 2NO_2 + \frac{1}{2}O_2$ Thus, the overall reaction can be shown as (6) $AlX_3 + NO_2ClO_4 + 7NO_2 \rightarrow$
$AlN_4O_{11} + NOClO_4 + 3NOX + \frac{1}{2}O_2$ The mixture thus obtained is then heated to the required temperature to produce the tris(nitronium)aluminum hexaperchlorate. However, as described above although not necessary to operability, economical operation requires the use of at least about 10 mols of nitrosyl perchlorate per mol of complex aluminum nitrate. A mixture of the reactants having such a ratio is obtained by using at least 10 mols of nitronium perchlorate per mol of aluminum halide in the first step described above; the overall reaction of Equation 6 then becomes (7) $AlX_3 + 10NO_2ClO_4 + 7NO_2 \rightarrow AlN_4O_{11} + 10NOClO_4 + 3NOX + 5O_2$ Heating the 10 to 1 mixture obtained in this manner to 100° C. or higher then produces complete reaction to the hexaperchlorate.

Exemplifying this embodiment of the invention is the following test:

*Example 3.*—146 millimols of nitronium perchlorate, 14.6 millimols of aluminum bromide and an excess of nitrogen dioxide (about 40 ml.) were reacted at 0 to 20° C. for eighteen hours. The solid product obtained after removal of the volatile reaction products was a mixture of complex aluminum nitrate and nitrosyl perchlorate in a 1 to 10 ratio. This mixture was heated at about 125° C. for twenty-four hours and 9.86 grams of solid tris(nitronium)aluminum hexaperchlorate were obtained.

The product of the above examples, as well as that obtained in other similar tests, was identified by chemical analysis, X-ray diffraction analysis and infra-red spectrophotometer examination. For example, the chemical analysis of a typical product, that obtained in Example 3 above, showed that it contained 3.7% aluminum, 28.2% chlorine, 5.5% nitrogen and the balance oxygen; the calculated composition of tris(nitronium)aluminum hexaperchlorate, $(NO_2)_3Al(ClO_4)_6$, is 3.5% aluminum, 27.8% chlorine, 5.5% nitrogen and 63.2% oxygen. X-ray diffraction patterns of these products showed that no nitronium perchlorate, nitrosyl perchlorate, aluminum nitrate or aluminum halide was present, thus showing that the reactants used were not found in the product.

The new compound of our invention is a crystalline solid, white in color, which appears to melt with decomposition at about 155 to 157° C. It is soluble in acetonitrile and nitromethane and is compatible with numerous other organic materials, such as pentane and hexane, in which it is insoluble. It is hypergolic when contacted with diethyl ether and low molecular weight olefins, such as 4-methyl pentene.

This compound is useful as a solid oxidizing agent in various applications. For example, it can be used with olefins or ether as a hypergolic igniter, or it can be used in conjunction with conventional fuels in rocket engines whereby its high oxidizing power aids in providing additional thrust beyond that now obtained by conventional systems. Thus, for example, it can be used to oxidize polyethylene in conventional rocket engines in the same manner as the known oxidizer ammonium perchlorate is used but our new compound provides additional thrust per pound of polyethylene used.

According to the provisions of the patent statutes, we have explained the principle and mode of practicing our invention and have described what we now consider to be its best embodiments. However, we desire to have it understood that, within the scope of the appended claims, the invention may be practiced otherwise than as specifically described.

We claim:
1. Tris(nitronium)aluminum hexaperchlorate,

$(NO_2)_3Al(ClO_4)_6$

2. A method of producing tris(nitronium)aluminum hexaperchlorate which comprises reacting complex aluminum nitrate having the empirical formula $AlN_4O_{11}$ and a perchlorate of the group consisting of nitrosyl perchlorate and nitronium perchlorate at a temperature of at least 100° C. and recovering the tris(nitronium)aluminum hexaperchlorate thus formed.

3. A method of producing tris(nitronium)aluminum hexaperchlorate which comprises reacting complex aluminum nitrate having the empirical formula $AlN_4O_{11}$ and nitrosyl perchlorate at a temperature of at least about 100° C. and recovering the tris(nitronium)aluminum hexaperchlorate thus formed.

4. A method in accordance with claim 3 in which at least about 10 mols of nitrosyl perchlorate are used per mol of complex aluminum nitrate.

5. A method of producing tris(nitronium)aluminum hexaperchlorate which comprises reacting complex aluminum nitrate having the empirical formula $AlN_4O_{11}$ and nitronium perchlorate at a temperature of at least 100° C. and recovering the tris(nitronium)aluminum hexaperchlorate thus formed.

6. A method in accordance with claim 5 in which at least about 6 mols of nitronium perchlorate are used per mol of complex aluminum nitrate.

7. A method of producing tris(nitronium)aluminum hexaperchlorate which comprises reacting as aluminum halide, nitronium perchlorate and nitrogen dioxide to produce a mixture of complex aluminum nitrate and nitrosyl perchlorate, heating said mixture to at least about 100° C. and recovering the tris(nitronium)aluminum hexaperchlorate thus formed.

8. A method in accordance with claim 7 in which at least about 10 mols of nitronium perchlorate are used per mol of aluminum halide.

9. A method in accordance with claim 7 in which said aluminum halide is aluminum chloride.

10. A method in accordance with claim 7 in which said aluminum halide is aluminum bromide.

11. A method of producing tris(nitronium)aluminum hexaperchlorate which comprises reacting an aluminum halide with nitrogen dioxide to produce complex aluminum nitrate, reacting said complex aluminum nitrate with nitronium perchlorate at a temperature of at least about 100° C. and recovering the tris(nitronium)aluminum hexaperchlorate thus formed.

12. A method according to claim 11 in which at least about 6 mols of nitronium perchlorate per mol of complex aluminum nitrate are used.

13. A method in accordance with claim 11 in which the aluminum halide is aluminum chloride.

No references cited.